(12) United States Patent
Chary (10) Patent No.: US 7,526,303 B2
(45) Date of Patent: Apr. 28, 2009

(54) METHOD AND APPARATUS TO MANAGE POWER IN A COMMUNICATION SYSTEM

(75) Inventor: Ram V. Chary, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 984 days.

(21) Appl. No.: 10/849,604

(22) Filed: May 19, 2004

(65) Prior Publication Data

US 2005/0261038 A1    Nov. 24, 2005

(51) Int. Cl.
*H04Q 7/20* (2006.01)

(52) U.S. Cl. .................... 455/513; 455/574; 455/127.5; 455/343.1

(58) Field of Classification Search ................. 455/574, 455/513, 572, 552.1, 553.1, 127.5, 343.1–343.6
See application file for complete search history.

(56) References Cited

U.S. PATENT DOCUMENTS

| | | | | |
|---|---|---|---|---|
| 5,983,101 | A * | 11/1999 | Billstrom | 455/522 X |
| 7,020,467 | B2 * | 3/2006 | Tada | 455/574 X |
| 7,062,302 | B2 * | 6/2006 | Yamaoka | 455/574 |
| 7,099,689 | B2 * | 8/2006 | Bahl et al. | 455/552.1 |
| 2004/0106441 | A1 * | 6/2004 | Kazakevich et al. | 455/574 |

* cited by examiner

*Primary Examiner*—Philip J Sobutka
(74) *Attorney, Agent, or Firm*—Kacvinsky LLC (57) ABSTRACT

Method and apparatus to manage power for a communication device having multiple radios are described.

14 Claims, 3 Drawing Sheets

METHOD AND APPARATUS TO MANAGE POWER IN A COMMUNICATION SYSTEM

BACKGROUND

Wireless communication networks are becoming increasingly ubiquitous due to the convenience and mobility offered to a user. New network services are continuously being added in an effort to build on these benefits. For example, mobile devices such as cellular telephones have traditionally been used for voice communications. These mobile devices, however, are becoming increasingly used for data communications, allowing a user to access a host of applications such as voice and electronic mail, conventional data networks such as the Internet and World Wide Web (WWW), document management services via network file servers, and so forth. Data communications, however, may consume a significant amount of power, which may lead to larger form factors for mobile devices.

DESCRIPTION OF SPECIFIC EMBODIMENTS

Figure 1:
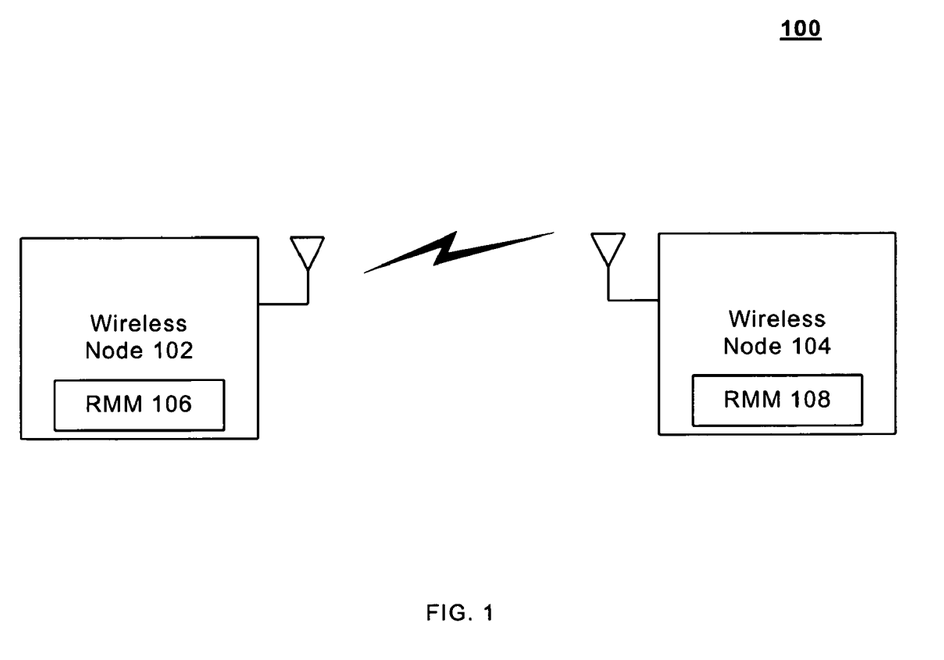
FIG. 1 illustrates a block diagram of a system 100.

FIG. 1 illustrates a block diagram of a system 100. System 100 may comprise, for example, a communication system to communicate information between multiple nodes. A node may comprise any physical or logical entity having a unique address in system 100. The unique address may comprise, for example, a network address such as an Internet Protocol (IP) address, device address such as a Media Access Control (MAC) address, and so forth. The embodiments are not limited in this context.

The nodes may be connected by one or more types of communications media. The communications media may comprise any media capable of carrying information signals, such as metal leads, semiconductor material, twisted-pair wire, co-axial cable, fiber optics, radio frequency (RF) spectrum, and so forth. The connection may comprise, for example, a physical connection or logical connection.

The nodes may be connected to the communications media by one or more input/output (I/O) adapters. The I/O adapters may be arranged to operate with any suitable technique for controlling communication signals between computer or network devices using a desired set of communications protocols, services and operating procedures. The I/O adapter may also include the appropriate physical connectors to connect the I/O adapter with a given communications medium. Examples of suitable I/O adapters may include a network interface card (NIC), radio/air interface, and so forth.

The nodes of system 100 may be arranged to communicate different types of information, such as media information and control information. Media information may refer to any data representing content meant for a user, such as voice information, video information, audio information, text information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes may communicate the media and control information in accordance with one or more protocols. A protocol may comprise a set of predefined rules or instructions to control how the nodes communicate information between each other. The protocol may be defined by one or more protocol standards, such as the standards promulgated by the Internet Engineering Task Force (IETF), International Telecommunications Union (ITU), Institute of Electrical and Electronic Engineers (IEEE), a company such as Intel® Corporation, and so forth.

Referring again to FIG. 1, system 100 may comprise a node 102 and a node 104. In one embodiment, for example, nodes 102 and 104 may comprise wireless nodes arranged to communicate information over a wireless communication medium, such as RF spectrum. Wireless node 102 and/or 104 may represent a number of different wireless devices, such as mobile or cellular telephone, a computer equipped with a wireless access card or modem, a handheld client device such as a wireless personal digital assistant (PDA), a wireless access point (WAP), a base station, a mobile subscriber center, a radio network controller (RNC), a mobile computer, and so forth. In one embodiment, for example, wireless node 102 may comprise a client device developed in accordance with the Personal Internet Client Architecture (PCA) by Intel® Corporation, such as a cellular telephone or Bluetooth enabled PDA. In one embodiment, for example, wireless node 104 may comprise another client device, or an access point for a wireless system, such as a base station or 802.11 WAP. In the latter case, the access point may also be connected to other access points such as another base station via one or more RNC, and one or more data networks, such as the Internet and WWW. In one embodiment, for example, the node may comprise a computer, such as a personal computer (PC), laptop computer, ultra-mobile laptop computer, server, workstation, and so forth. The embodiments are not limited in this context.

Although FIG. 1 shows a limited number of nodes, it can be appreciated that any number of nodes may be used in system 100. Further, although the embodiments may be illustrated in the context of a wireless communications system, the principles discussed herein may also be implemented in a wired communications system, or a combination of wireless and wired system, and still fall within the scope of the embodiments. An example of the latter case may comprise a laptop which operates as a wireless node, but when connected to a docking station operates as a wired node. The embodiments are not limited in this context.

In one embodiment, each wireless node may operate using different power sources. For example, one power source may comprise an external power source, such as an alternating current (AC) main power source in a home or office. In another example, one power source may comprise an internal power source, such as a battery providing direct current (DC). An example of a battery may comprise a lithium ion polymer battery for use in a cellular phone. Wireless node 102 and/or 104 typically use only one power source at a time, with the external power source to take precedence due to its continuous availability. The embodiments, however, are not limited in this context.

In one embodiment, each wireless node may be arranged with two or more radios. Each wireless node may be arranged to perform data communications in accordance with a number of different communication protocols. For example, wireless node 102 and/or 104 may communicate data in accordance with the IETF Internet Protocol (IP), IETF Transmission Control Protocol (TCP), IEEE 802.11, IEEE 802.16, General Packet Radio Service (GPRS), Enhanced GPRS (EGPRS), Bluetooth, and so forth. Each protocol may be implemented with a different radio, which may comprise the components and air interfaces suitable for communicating information signals over the designated RF spectrum for a given protocol. For example, each radio may include one or more wireless RF transmitters/receivers ("transceivers"), power amplifiers, directional couplers, control logic, and so forth. The radios may also be connected to one or more omni-directional antennas. The embodiments are not limited in this context.

Alternatively, each wireless node may comprise a single reconfigurable radio, sometimes referred to as a "software defined" radio. The software defined radio may be arranged to perform data communications in accordance with a number of different communication protocols as in the multiple radio example given above. The software defined radio may operate in accordance with a particular protocol sequentially, or may handle one or more protocols in parallel. The embodiments are not limited in this context.

In one embodiment, wireless node 102 and/or 104 may include radio management modules (RMM) 106 and 108, respectively. Each RMM may control the radios for wireless node 102 and/or 104. Each radio may offer different data communication services that may vary in terms of bandwidth, latency, power consumption, range, and so forth. For example, wireless node 102 may comprise an 802.11 radio and a GPRS radio. When an application requests a data connection to perform data communications, the RMM may select one of the 802.11 radio or GPRS radio to establish the data connection based on the characteristics of each radio and the needs of the requesting application. For example, the RMM may select a particular radio based on power consumption, which may be a limited resource for wireless devices. RMM 106 and 108 may be discussed in more detail with reference to FIGS. 2 and 3.

Figure 2:
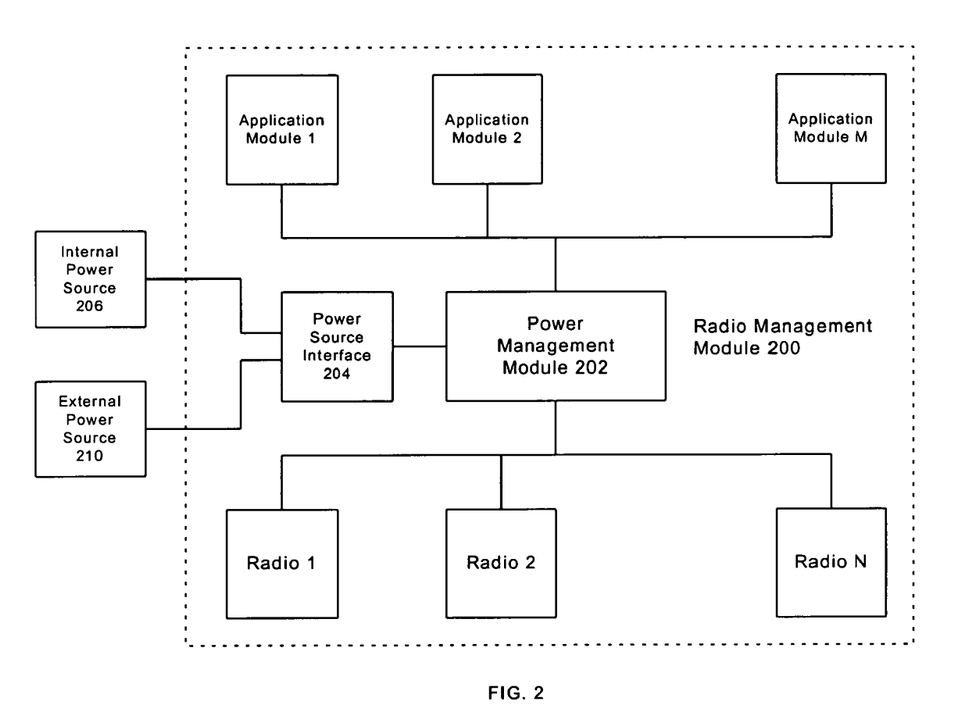
FIG. 2 illustrates a block diagram of a subsystem 200.

FIG. 2 illustrates a block diagram of a subsystem 200. Subsystem 200 may be representative of, for example, RMM 106 and 108 described with reference to FIG. 1. As shown in FIG. 2, RMM 200 may comprise a number of different elements, such as a set of application modules 1-M, a set of radios 1-N, a power management module (PMM) 202 to connect to application modules 1-M and radios 1-N, and a power source interface 204 to connect to PMM 202. A module may comprise, for example, one or more circuits, components, registers, processors, software subroutines, or any combination thereof. Although FIG. 2 shows a limited number of elements, it can be appreciated that any number of elements may be used in RMM 200.

In one embodiment, RMM 200 may comprise application modules 1-M. Applications modules 1-M may comprise any application to be executed by wireless nodes 102 and/or 104 that is arranged to communicate information. For example, the application may comprise a web browser to access the Internet, a file transfer protocol (FTP) program, an electronic mail program, a document management program, and so forth. The embodiments are not limited in this context.

In one embodiment, RMM 200 may comprise radios 1-N. Radios 1-N may comprise any radio arranged to perform data communications over a wireless medium, such as RF spectrum. For example, the radio may comprise an 802.11 radio, a GPRS radio, an EGPRS radio, a Bluetooth Radio, and so forth. The embodiments are not limited in this context.

In one embodiment, RMM 200 may comprise power source interface 204. Power source interface 204 may be connected to PMM 202. Power source interface 204 may monitor the different power sources available to a wireless and/or wired node. For example, each node may be arranged to operate using an internal power source 206 and an external power source 208. Internal power source 206 may be used, for example, when a node is operating in a wireless environment and does not have access to external power source 208. External power source 208 may be used, for example, when a node is operating in a wired environment (e.g., a laptop connected to a docking station) and/or when the node has access to a continuous power supply, such as the AC power mains. Power source interface 204 may monitor which power source is currently available, and pass this information to PMM 202. PMM 202 may use this information to implement a radio selection policy for RMM 200.

In one embodiment, RMM 200 may comprise PMM 202. PMM 202 may perform power management for wireless node 102 and/or 104 in general, and RMM 200 in particular. For example, PMM 202 may be a separate module to perform power management for radios 1-N of RMM 200, or may be part of an overall power management module for wireless node 102 and/or 104. PMM 202 may connect to application modules 1-M and radios 1-N. PMM 202 may receive a request for a data connection from one of application modules 1-M, select a data connection radio from radios 1-N in accordance with a radio selection policy, and establish the data connection using the data connection radio. PMM 202 may attempt to manage power for RMM 200 when wireless nodes 102 and/or 104 are operating from an internal power source, such as a battery, for example.

In one embodiment, the radio selection policy may comprise a set of rules to select the data connection radio based on, for example, a power source for radios 1-N. PMM 202 may be connected to power source interface 204. Power source interface 204 may be arranged to indicate a connection to internal power source 206 or external power source 208. External power source 208 may comprise, for example, an AC power supply. Internal power source 206 may comprise, for example, a DC power supply from a battery. When connected to external power source 208, power management may become less important and other considerations may influence selection of an appropriate radio. For example, PMM 202 may select a data connection radio having the highest amount of available bandwidth, strongest signal, load balancing, and so forth.

When connected to internal power source 206, however, power management may increase in importance. Radios consume a relatively large portion of the power for an entire wireless node. In some cases, for example, the radios may consume approximately 25% of the overall power for wireless node 102 and/or 104. Users are seemingly unwilling to lower power management expectations. Adding a larger battery is not particularly desirable given that users expect new capabilities in smaller form factors. Consequently, aggressive system power management becomes increasingly important, particularly in a wireless node having multiple radios.

To solve these and other problems, PMM 200 may implement a radio selection policy to select a radio to conserve system power from internal power source 206. PMM 200 may implement a rule set constructed from a power management perspective, which attempts to conserve power while maintaining overall system performance. The rule set may reflect a number of different factors relating to each radio, although giving primary consideration to power consumption. Additional factors relating to the radio may include available bandwidth, latency, signal strength, current load, range, and so forth. The rule set may also reflect a number of different factors relating to each application, such as maximum or minimum bandwidth requirements, an amount of latency tolerated by the application, quality of service (QoS) or priority levels, and so forth. These factors, and the relative priority of these factors, may be captured in a rule set that may vary according to a given implementation. By managing multiple radios 1-N from a power perspective, smaller form factors may be realized while improving overall system features for wireless node 102 and/or 104. This may be discussed in more detail with reference to FIG. 3.

Operations for system 100 and RMM 200 may be further described with reference to FIG. 3 and accompanying examples. Although FIG. 3 as presented herein may include a particular programming logic, it can be appreciated that the programming logic merely provides an example of how the general functionality described herein can be implemented. Further, the given programming logic does not necessarily have to be executed in the order presented unless otherwise indicated. In addition, although the given programming logic may be described herein as being implemented in the above-referenced modules, it can be appreciated that the programming logic may be implemented anywhere within the system and still fall within the scope of the embodiments.

Figure 3:
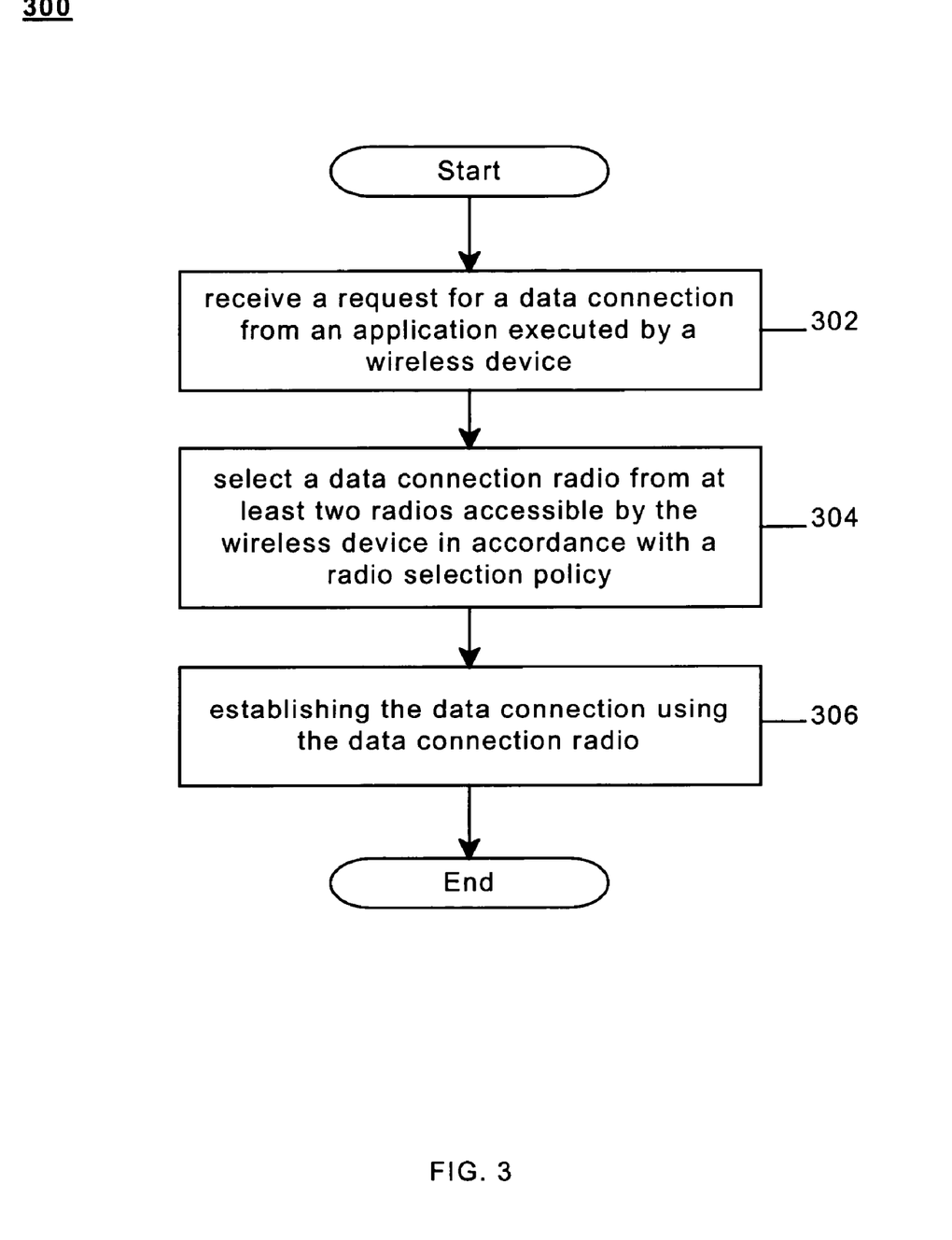
FIG. 3 illustrates a block diagram of a processing logic 300.

FIG. 3 illustrates a programming logic 300. Programming logic 300 may be representative of the operations executed by one or more systems described herein, such as system 100 and/or RMM 200. As shown in programming logic 300, a request for a data connection may be received from an application executed by a wireless device at block 302. A data connection radio may be selected from at least two radios accessible by the wireless device in accordance with a radio selection policy at block 304. The term "data connection radio" may refer to the radio selected in accordance with the radio selection policy to establish the data connection for the requesting application. The radio selection policy may comprise a set of rules to select the data connection radio based on a power source for the radios. The data connection may be established using the data connection radio at block 306.

In one embodiment, the data connection radio may be selected by retrieving for each radio a radio bandwidth value, a radio power cost value, and a radio status value. The radio bandwidth value may reflect the amount of bandwidth or throughput available for the radio, typically expressed in bits or bytes per second. For example, the radio bandwidth value for a Bluetooth radio may comprise approximately 1 Megabits per second (Mbps). The radio power cost value may reflect the amount of power expended by the radio. For example, the Bluetooth radio may need approximately 100 Milliwatts (mW) to operate. The radio status value may reflect whether the radio is within communication range with another client device, such as another Bluetooth enabled device, or an access point, such as a base station, 802.11 WAP, and so forth. For example, the Bluetooth radio may have a range of approximately 100 feet. The radio status value may be expressed as a range of values corresponding to signal strength as measured by a given signal-to-noise ratio (SNR), or it may be a Boolean expression based on a minimum SNR for a given radio (e.g., Active=True and Inactive=False). It can be appreciated that the Bluetooth radio and its corresponding values are given by way of example, and the embodiments are not limited in this context.

A determination may be made as to whether the radios are using an external power source or an internal power source. The data connection radio may be selected in accordance with this determination.

If the radios are using an external power source, power management may become less critical, and therefore other factors may be used to determine the radio selected to be the data connection radio. For example, the data connection radio may be selected using the radio bandwidth values if the radios are using the external power source. This may be accomplished by retrieving a radio status value for each radio, and comparing the radio bandwidth values for the radios having their radio status value set to active. The radio having a higher radio bandwidth value than the other radios may be selected as the data connection radio. It may be appreciated, however, that other rules may be used to accommodate a given implementation. The embodiments are not limited in this context.

If the radios are using an internal power source, however, power management may become more critical. In this case, the data connection radio may be selected using the radio power cost values if the radios are using the internal power source. This may be accomplished by ordering the radios based on the radio power cost values from a first radio to a last radio. For example, the first radio may have the lowest radio power cost value and the last radio may have the highest radio power cost value, or vice-versa. An application bandwidth value and application latency value may be retrieved for the application. A radio status value may also be retrieved. The application bandwidth value may represent the amount of bandwidth needed by the application. The application bandwidth value may comprise, for example, a maximum amount of bandwidth, a minimum amount of bandwidth, an average amount of bandwidth, a burst bandwidth, and so forth. The application latency value may represent the amount of latency the application can tolerate. The application latency value may comprise, for example, a maximum amount of latency, a minimum amount of latency, an average amount of latency, and so forth. The application bandwidth value and application latency value may be compared with a radio bandwidth value and radio latency value for each radio starting with the first radio that is operational as indicated by its radio status value. In one embodiment, for example, the first radio may comprise the radio with the lowest amount of power consumption. This comparison may continue through each radio 1-N until a radio is found that has the lowest amount of power consumption while still accommodating the bandwidth and latency parameters requested by the application.

The radio and application values may be implemented in a radio selection policy in the form of one or more rules. For example, the data connection radio may comprise an active radio having a radio bandwidth value higher than the application bandwidth value and a radio latency value lower than the application latency value. It may be appreciated, however, that other rules may be used for a given implementation. The embodiments are not limited in this context.

In one embodiment, the radio selection policy may be robust enough to dynamically adapt to changing conditions, such as changes in power source, device roaming, changes in QoS, and so forth. For example, an initial radio may be selected in accordance with a first set of conditions. The RMM may monitor the appropriate interfaces for changes in the first set of conditions, and re-select a different radio in accordance with the changes. The RMM may also select a different radio in accordance with changes initiated by one or more devices in communication with the RMM.

The operation of the above described systems and associated programming logic may be better understood by way of example. Assume wireless node 102 comprises an 802.11 radio and a GPRS radio, both of which are available for use by an application. The power requirements for each radio may be summarized in Table 1 as follows:

TABLE 1

| Radio | Power | Bandwidth | Range |
|---|---|---|---|
| Bluetooth | <100 mW | 400-800 Kbps | 100 Feet |
| 802.11 | 500 mW to 1 W | 10 Mbps | 300 Feet |
| GPRS | 1-2 W | 56 Kbps | 2-3 Miles |

Assume an application needs to establish a data connection in accordance with the Internet Protocol. PMM 202 would determine whether wireless node 102 is operating using internal power source 206 or external power source 208 via power source interface 204. If wireless node 102 is operating using external power source 208, PMM 202 may be disabled, or may revert to some default mode such as selecting a radio having the highest available amount of bandwidth, strongest signal, SNR, available networks, and so forth.

If wireless node 102 is operating using internal power source 206, however, PMM 202 may start evaluating the application and available radios to select a radio that consumes the least amount of power for wireless node 102 while still servicing the application. This may be accomplished in accordance with the rules established for the radio selection policy.

Assume the application is a web browser, and a user uses the web browser to perform sporadic web accesses with an average data rate of 20 Kbps. The web browser also belongs to a class of applications that can tolerate some level of latency by the data connection, thereby deemphasizing the latency needs for the application. Further assume that only the 802.11 radio and GPRS radio are active. In this case, PMM 202 may select the GPRS radio over the 802.11 radio since the GPRS radio fulfills the bandwidth and latency needs for the application over the relevant time period the GPRS radio is to be used by the application, and yet results in lower overall power consumption from internal power source 206. This may occur since the GPRS radio might be more efficient at downloading smaller bandwidths by not being on all the time. The GPRS radio is only on when it is receiving data. Contrast this with a particular 802.11 implementation which might keep the radio on receive mode, thereby consuming close to 1 W, while waiting for the intermittent data.

By way of contrast, assume the application is a request to download a 5 megabyte file via a FTP application. In this case, PMM 202 may select the 802.11 radio over the GPRS radio since the 802.11 radio fulfills the bandwidth requirements for the application yet results in lower overall power consumption from internal power source 206.

The radio selection policy may vary according to a given implementation. The following pseudo-code may be representative of the type of radio selection policy that may be appropriate for implementing PMM 202:

```
Start Pseudo Code
While (forever)
{
    if (System_Power == Internal Power Source)
    {
        BW_App[App_Num] == Application_Bandwidth_Value;
        Latency_App[App_Num] == Application_Latency_Value;
    }
    Max_Bandwidth_Req = Max (BW_App[1..n];
    Min_Latency_Req = Min (Latency_App[1..n];
    While (Radio_Num = Lowest_Power_Radio; Radio_Num <= Max_Radios; Radio_Num++)
    {
        if (Max_Bandwidth_Req <=
        Radio_Bandwidth_Value[Radio_Num] AND
        Min_Latency_Req
        >= Radio_Latency_Value[Radio_Num]) AND
        Radio_Status_Value = Active)
        {
            Current_Active_Radio = Radio_Num;
            Exit Loop;
        }
    }
    else
    {
        if (Highest_Bandwidth =
        Radio_Bandwidth_Value[Radio_Num])
        Current_Active_Radio = Radio_Num;
    }
}
End Pseudo Code
```

In one embodiment, PMM 202 may perform power management on a continuous basis, a periodic basis, or in response to an external event. Continuous or periodic power management may provide the advantage of allowing RMM 200 to switch radios as lower power radios become available. This may occur, for example, when a previous application releases the lower power radio or a lower power radio becomes active. An example of an external event may comprise an explicit request to switch radios to decrease latency times. The request may be originated by a user, application, RMM 200, system power management for wireless node 102 and/or 104, an external device such as base station or RNC, and so forth. The embodiments are not limited in this context.

In one embodiment, PMM 202 may also be arranged to implement rules relating to the overall system for wireless node 102 and/or 104 in addition to those directed to RMM 200. For example, one rule may turn the screen area for the top-most application to 100%, turn on the effective area for all other applications in the background to 50%, and turn the remaining screen to zero intensity. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

All or portions of an embodiment may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

The invention claimed is:

1. A system, comprising:
an antenna;
a radio management module to connect to said antenna, said radio management module to comprise:
a set of application modules 1-M
a set of radios 1-N;
a power management module to connect to said application modules 1-M and said radios 1-N, said power management module to receive a request for a data connection from one of said application modules 1-M, select a data connection radio from said set of radios 1-N in accordance with a radio selection policy, and establish said data connection using said data connection radio, wherein said radio selection policy comprises a set of rules to select said data connection radio based on a minimum bandwidth requirement for said application modules 1-M; and a power source interface to connect to said power management module, said power source interface to indicate a connection to an external power source or an internal power source, wherein said power management module selects said data connection radio using a set of radio bandwidth values corresponding to said radios 1-N if said power source interface indicates a connection to an external power source, and a set of radio power cost values corresponding to said radios 1-N if said power source interface indicates a connection to an internal power source.

2. The system of claim 1, wherein said radio selection policy comprises a set of rules to select said data connection radio based on a power source for said radios.

3. The system of claim 1, wherein said external power source comprises an alternating current power supply, and said internal power source comprises a direct current power supply.

4. An apparatus, comprising:
a set of application modules 1-M;
a set of radios 1-N;
a power management module to connect to said application modules 1-M and said radios 1-N, said power management module to receive a request for a data connection from one of said application modules 1-M, select a data connection radio from said set of radios 1-N in accordance with a radio selection policy, and establish said data connection using said data connection radio, wherein said radio selection policy comprises a set of rules to select said data connection radio based on a minimum bandwidth requirement for said application modules 1-M; and
a power source interface to connect to said power management module, said power source interface to indicate a connection to an external power source or an internal power source,
wherein said power management module selects said data connection radio using a set of radio bandwidth values corresponding to said radios 1-N if said power source interface indicates a connection to an external power source, and using a set of radio power cost values corresponding to said radios 1-N if said power source interface indicates a connection to an internal power source.

5. The apparatus of claim 4, wherein said radio selection policy comprises a set of rules to select said data connection radio based on a power source for said radios.

6. The apparatus of claim 4, wherein said external power source comprises an alternating current power supply, and said internal power source comprises a direct current power supply.

7. A method, comprising:
receiving a request for a data connection from an application executed by a wireless device;
selecting a data connection radio from at least two radios accessible by said wireless device in accordance with a radio selection policy, said selecting comprising:
retrieving a radio bandwidth value and a radio power cost value for each radio;
determining whether said radios are using an external power source or an internal power source;
selecting said data connection radio using said radio bandwidth values if said radios are using said external power source; and
selecting said data connection radio using said radio power cost values if said radios are using said internal power source; and
establishing said data connection using said data connection radio, wherein said radio selection policy comprises a set of rules to select said data connection radio based on a minimum bandwidth requirement for said application modules 1-M.

8. The method of claim 7, wherein said radio selection policy comprises a set of rules to select said data connection radio based on a power source for said radios.

9. The method of claim 7, wherein selecting said data connection radio using said radio bandwidth values comprises:
retrieving a radio status value for each radio;
comparing said radio bandwidth values for all radios having said radio status value set to active; and
selecting said data connection radio having a higher radio bandwidth value.

10. The method of claim 7, wherein said selecting said data connection radio using said radio power cost values comprises:
ordering said radios based on said radio power cost values from a first radio to a last radio;
retrieving an application bandwidth value and application latency value for said application, and a radio status value for each radio;
comparing said application bandwidth value and application latency with a radio bandwidth value and radio latency value for each radio having said radio status value set to active starting with said first radio; and
selecting said data connection radio having a radio bandwidth value higher than said application bandwidth value and a radio latency value lower than said application latency value.

11. The method of claim 7, wherein said first radio has a lowest radio power cost value and said last radio has a highest radio power cost.

12. An article comprising:
a storage medium;
said storage medium including stored instructions that, when executed by a processor, are operable to:
receive a request for a data connection from an application executed by a wireless device,
select a data connection radio from at least two radios accessible by said wireless device, in accordance with a radio selection policy, using stored instructions operable to retrieve a radio bandwidth value and a radio power cost value for each radio, determine whether said radios are using an external power source or an internal power source, select said data connection radio using said radio bandwidth values if said radios are using said external power source, and select said data connection radio using said radio power cost values if said radios are using said internal power source, and
establish said data connection using said data connection radio, wherein said radio selection policy comprises a set of rules to select said data connection radio based on a minimum bandwidth requirement for said application modules 1-M.

13. The article of claim 12, wherein the stored instructions, when executed by a processor, select said data connection radio using said radio bandwidth values using stored instructions operable to retrieve a radio status value for each radio, compare said radio bandwidth values for all radios having said radio status value set to active, and select said data connection radio having a higher radio bandwidth value.

14. The article of claim 12, wherein the stored instructions, when executed by a processor, select said data connection radio using said radio power cost values using stored instructions operable to order said radios based on said radio power cost values from a first radio to a last radio, retrieve an application bandwidth value and application latency value for said application and a radio status value for each radio, compare said application bandwidth value and application latency with a radio bandwidth value and radio latency value for each radio having said radio status value set to active starting with said first radio, and select said data connection radio having a radio bandwidth value higher than said application bandwidth value and a radio latency value lower than said application latency value.

* * * * *

UNITED STATES PATENT AND TRADEMARK OFFICE
CERTIFICATE OF CORRECTION

PATENT NO. : 7,526,303 B2
APPLICATION NO. : 10/849604
DATED : April 28, 2009
INVENTOR(S) : Ram V. Chary It is certified that error appears in the above-identified patent and that said Letters Patent is hereby corrected as shown below:

In column 8, line 59, in Claim 1, delete "1-M" and insert -- 1-M; --, therefor.

Signed and Sealed this

Sixteenth Day of March, 2010

David J. Kappos
*Director of the United States Patent and Trademark Office*